(12) United States Patent
Taguchi et al.

(10) Patent No.: US 8,705,204 B2
(45) Date of Patent: Apr. 22, 2014

(54) RECORDING HEAD WITH HIGH-FREQUENCY OSCILLATOR AND BI-LAYER MAIN POLE HEIGHT/WIDTH ARRANGEMENT

(75) Inventors: Tomoko Taguchi, Kunitachi (JP); Kenichiro Yamada, Tokyo (JP); Katsuhiko Koui, Yokohama (JP); Tomomi Funayama, Fuchu (JP); Norihito Fujita, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/591,012

(22) Filed: Aug. 21, 2012

(65) Prior Publication Data
US 2013/0215532 A1  Aug. 22, 2013

(30) Foreign Application Priority Data

Feb. 17, 2012 (JP) ................. 2012-033161

(51) Int. Cl.
*G11B 5/31* (2006.01)
(52) U.S. Cl.
USPC ............. 360/125.12; 360/125.14; 360/125.15
(58) Field of Classification Search
CPC ............... G11B 5/3116; G11B 5/3146; G11B 2005/0002
USPC ............................ 360/125.12, 125.14, 125.15
See application file for complete search history.

(56) References Cited

U.S. PATENT DOCUMENTS

| | | | |
|---|---|---|---|
| 6,687,084 B2 | 2/2004 | Takahashi et al. | |
| 6,958,886 B2 | 10/2005 | Takahashi et al. | |
| 7,181,829 B2 | 2/2007 | Takahashi et al. | |
| 7,472,470 B2 | 1/2009 | Takahashi et al. | |
| 7,848,053 B2 | 12/2010 | Mochizuki et al. | |
| 2002/0080524 A1 | 6/2002 | Takahashi et al. | |
| 2003/0193744 A1 | 10/2003 | Takahashi et al. | |
| 2006/0002025 A1 | 1/2006 | Takahashi et al. | |
| 2007/0115594 A1 | 5/2007 | Takahashi et al. | |
| 2007/0188921 A1 | 8/2007 | Mochizuki et al. | |
| 2009/0080120 A1* | 3/2009 | Funayama et al. | 360/313 |
| 2009/0290257 A1 | 11/2009 | Kimura et al. | |
| 2011/0128652 A1* | 6/2011 | Taguchi et al. | 360/123.12 |
| 2012/0262821 A1* | 10/2012 | Taguchi et al. | 360/119.02 |

FOREIGN PATENT DOCUMENTS

| | | |
|---|---|---|
| JP | 2002-197615 A | 7/2002 |
| JP | 2007-220208 A | 8/2007 |
| JP | 2009-283067 A | 12/2009 |

* cited by examiner

*Primary Examiner* — Craig A. Renner
(74) *Attorney, Agent, or Firm* — Knobbe Martens Olson & Bear LLP

(57) ABSTRACT

According to one embodiment, a main pole of a recording head includes a first magnetic pole layer and a second magnetic pole layer laminated on the trailing side of the first magnetic pole layer. The first magnetic pole layer includes a tapered portion and a first tip portion. The second magnetic pole layer includes a tapered portion and a second tip portion. A width in a track direction of the second tip portion is smaller than that of the first tip portion. The high-frequency oscillator is between the second tip portion and the trailing shield and includes a width in the track direction substantially equal to the width in the track direction of the second tip portion, and a height of the first tip portion is taller than that of the second tip portion.

8 Claims, 12 Drawing Sheets

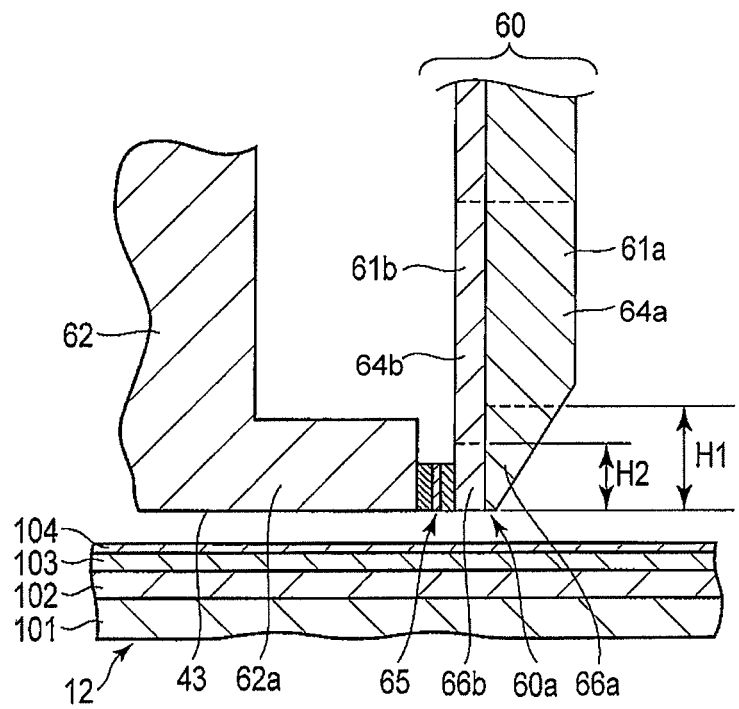
F I G. 5
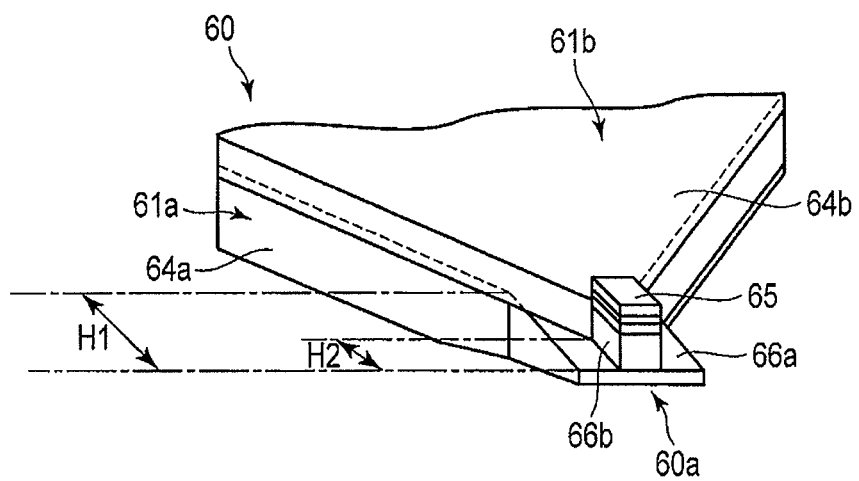
F I G. 6

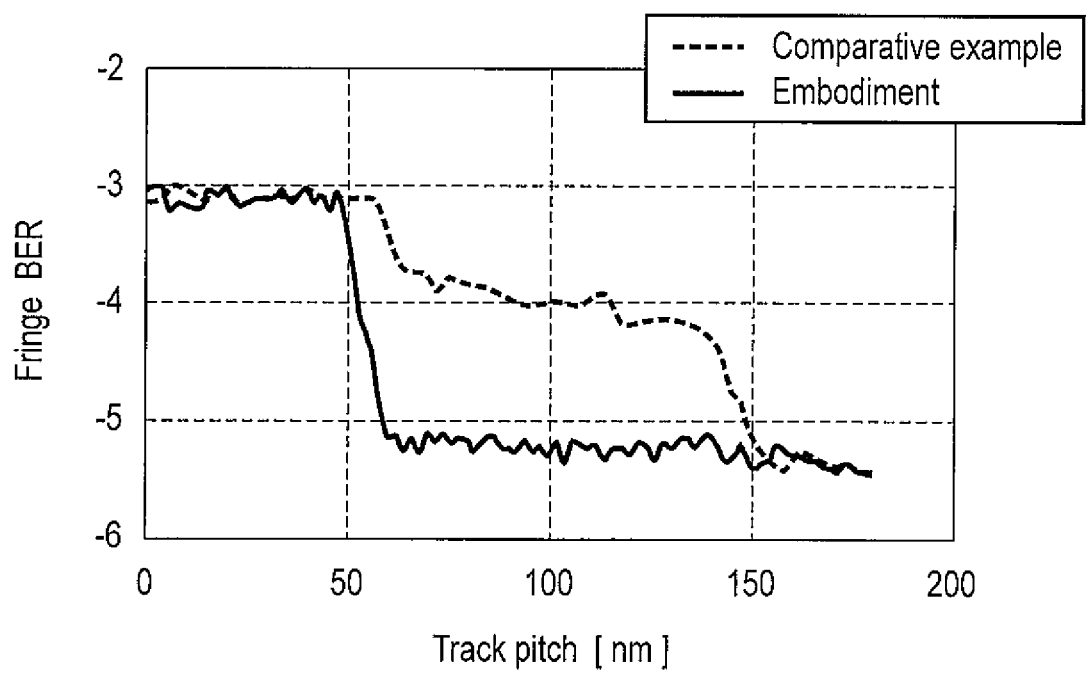
F I G. 9

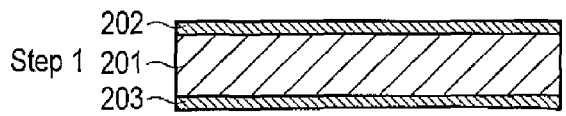
FIG. 11 (A-1)
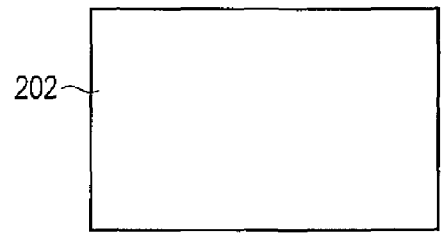
FIG. 11 (B-1)
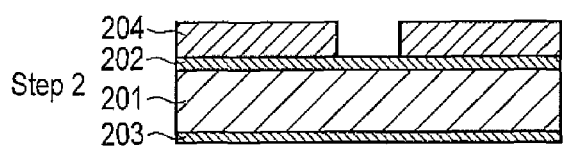
FIG. 11 (A-2)
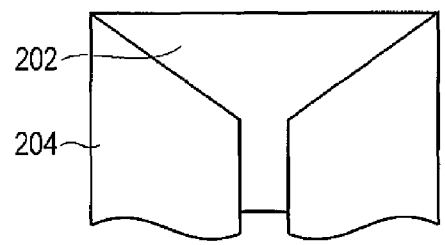
FIG. 11 (B-2)
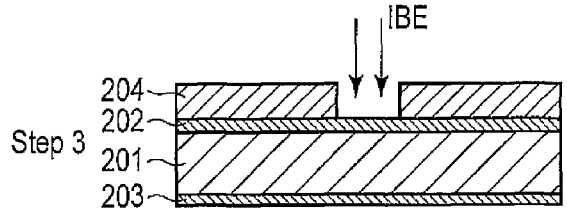
FIG. 11 (A-3)
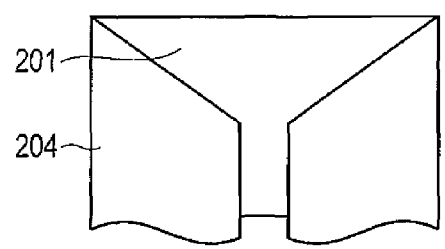
FIG. 11 (B-3)
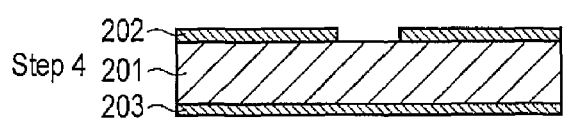
FIG. 11 (A-4)
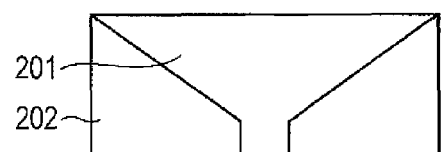
FIG. 11 (B-4)
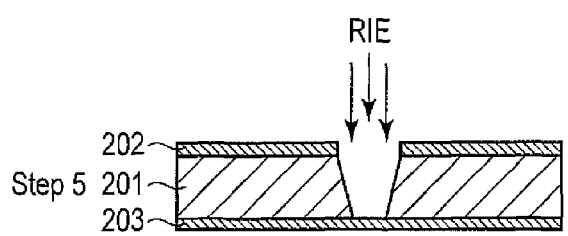
FIG. 11 (A-5)
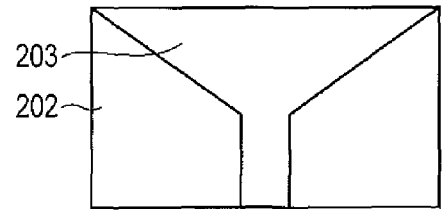
FIG. 11 (B-5)

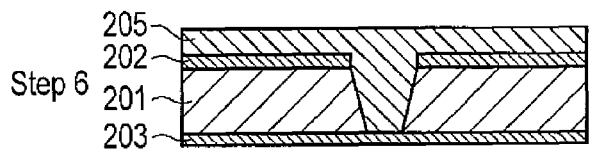
F I G. 12 (A-6)
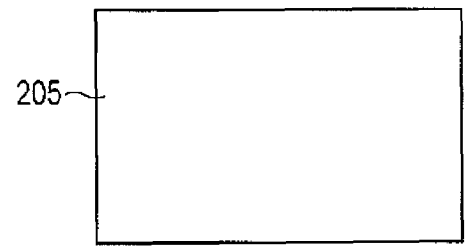
F I G. 12 (B-6)
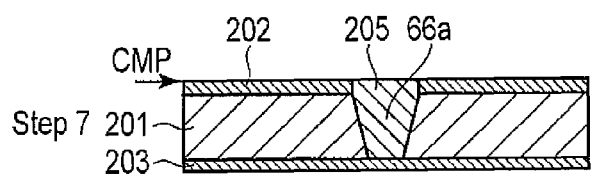
F I G. 12 (A-7)
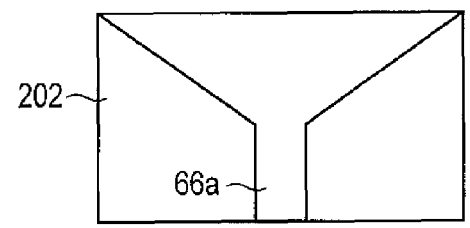
F I G. 12 (B-7)
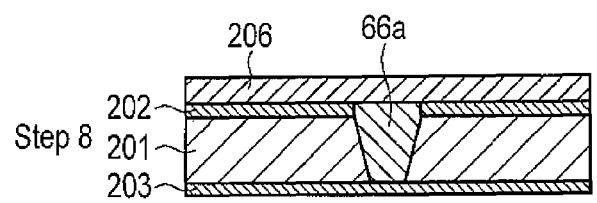
F I G. 12 (A-8)
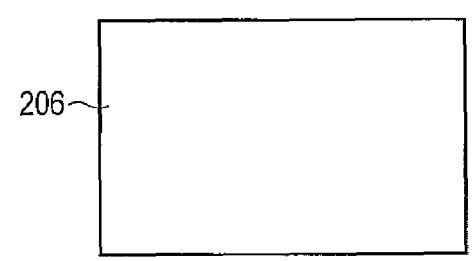
F I G. 12 (B-8)
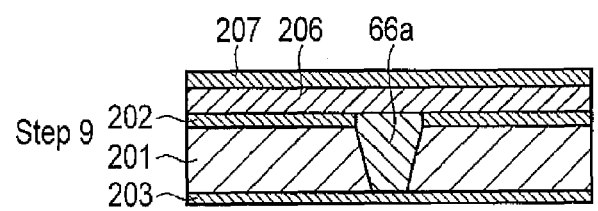
F I G. 12 (A-9)
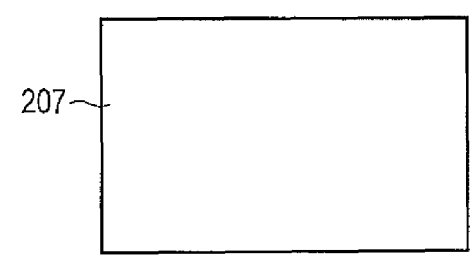
F I G. 12 (B-9)

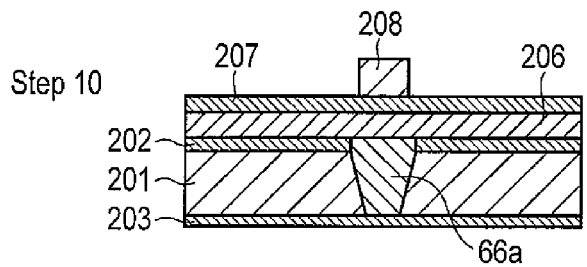
F I G. 13 (A-10)
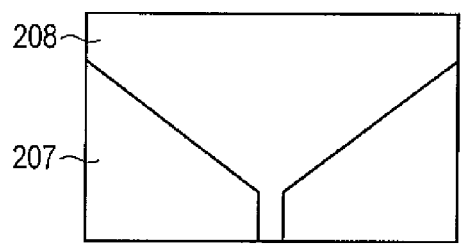
F I G. 13 (B-10)
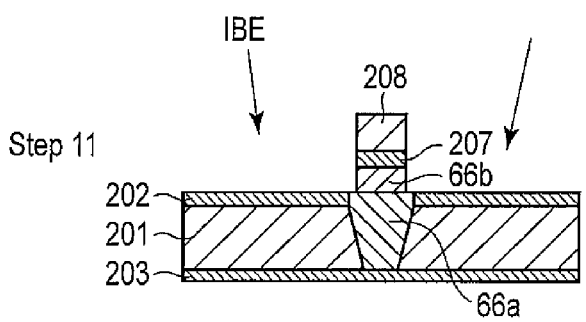
F I G. 13 (A-11)
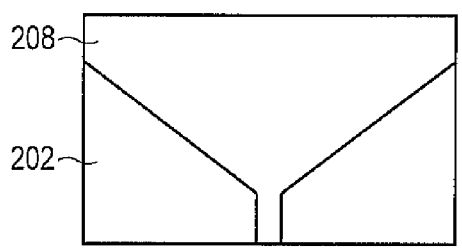
F I G. 13 (B-11)
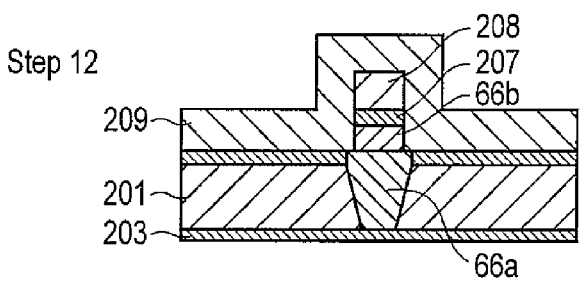
F I G. 13 (A-12)
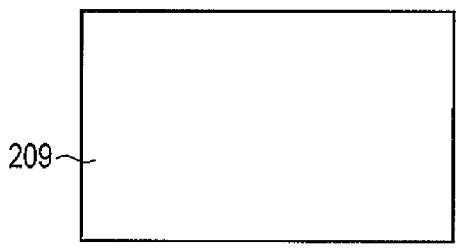
F I G. 13 (B-12)
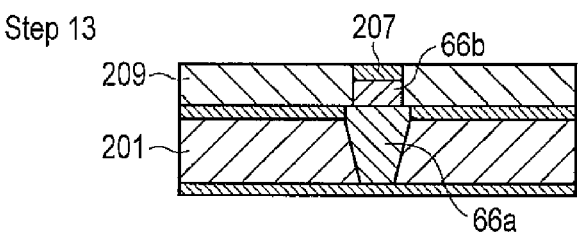
F I G. 13 (A-13)
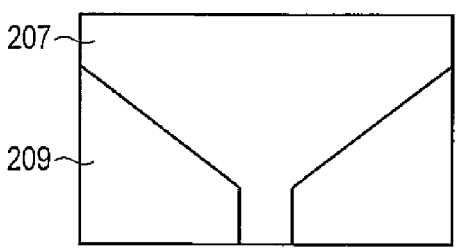
F I G. 13 (B-13)

Step 14
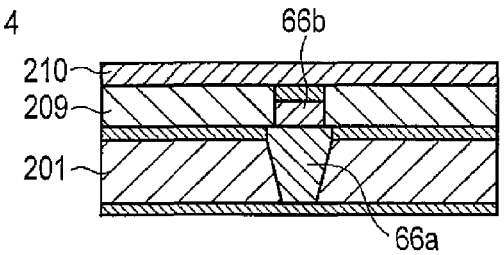
FIG. 14 (A-14)
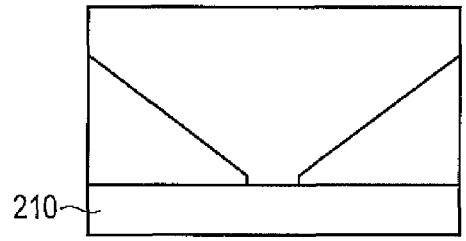
FIG. 14 (B-14)
Step 15
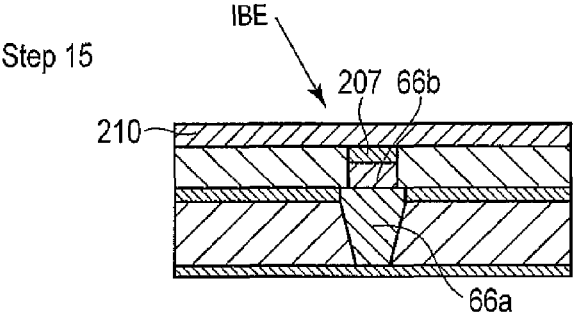
FIG. 14 (A-15)
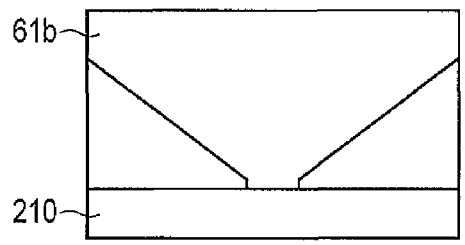
FIG. 14 (B-15)
Step 16
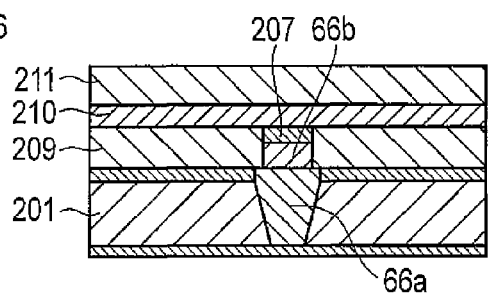
FIG. 14 (A-16)
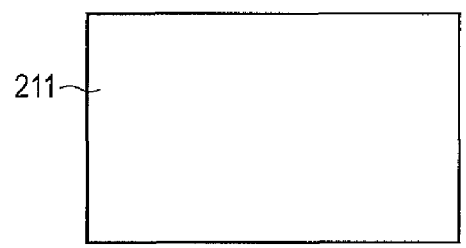
FIG. 14 (B-16)
Step 17
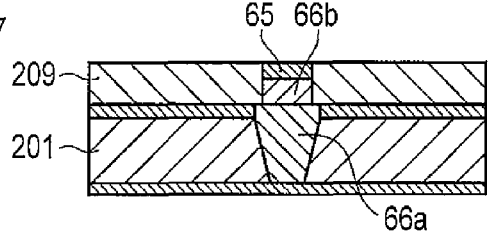
FIG. 14 (A-17)
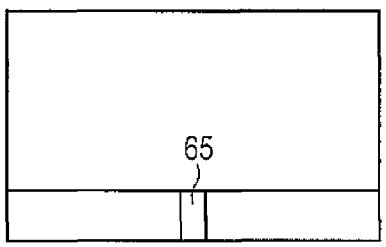
FIG. 14 (B-17)

RECORDING HEAD WITH HIGH-FREQUENCY OSCILLATOR AND BI-LAYER MAIN POLE HEIGHT/WIDTH ARRANGEMENT

CROSS-REFERENCE TO RELATED APPLICATIONS

This application is based upon and claims the benefit of priority from Japanese Patent Application No. 2012-033161, filed Feb. 17, 2012, the entire contents of which are incorporated herein by reference.

FIELD

Embodiments described herein relate generally to a recording head for perpendicular magnetic recording used in a disk drive and the disk drive with the recording head.

BACKGROUND

A disk drive, such as a magnetic disk drive, comprises a magnetic disk, spindle motor, magnetic head, and carriage assembly, which are disposed in a case. The spindle motor supports and rotates the magnetic disk. The magnetic head reads data from and writes data to the magnetic disk. The carriage assembly supports the magnetic head for movement relative to the magnetic disk. The carriage assembly comprises a rotatable arm, and a suspension extending from the arm. The magnetic head is supported on the distal end of the suspension. The magnetic head comprises a slider attached to the suspension, and a head section provided on the slider. The head section comprises a recording head for writing and a read head for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, a trailing shield, and a coil. The trailing shield is located on the trailing side of the main pole with a write gap therebetween and configured to close a magnetic path that leads to the magnetic disk. The coil serves to pass magnetic flux through the main pole.

A magnetic head based on high-frequency magnetic field assist recording is proposed in which a high-frequency oscillation element is provided between the main pole and an end portion on the medium side of the trailing shield and a current is applied to the high frequency oscillation element through the main pole and trailing shield.

Recording magnetic poles used in the magnetic head comprising the high-frequency oscillation element is configured so that the across-track size of the oscillation element is substantially equal to that of the main pole. This equality in size can be achieved by a process in which the main pole and oscillation element are milled together. If this milling process is performed using a conventional main pole shape, however, a leakage magnetic field from an across-track edge part of a leading end portion of the main pole is so strong that it inevitably erases or degrades adjacent tracks at the track edge of the leading end portion.

BRIEF DESCRIPTION OF THE DRAWINGS

FIG. 5 is an enlarged sectional view showing a disk-side end portion of the recording head;

FIG. 6 is a perspective view showing a high-frequency oscillator and a tapered tip portion of a main pole of the recording head;

FIG. 9 is a diagram comparatively showing the relationship between track pitch and fringe BER for the recording head according to the first embodiment and the recording head according to the comparative example;

FIGS. 11(A-1), 11(A-2), 11(A-3), 11(A-4), and 11(A-5) and FIGS. 11(B-1), 11(B-2), 11(B-3), 11(B-4), and 11(B-5) are sectional and front views showing manufacturing processes for the recording head;

FIGS. 12(A-6), 12(A-7), 12(A-8), and 12(A-9), and FIGS. 12(B-6) 12(B-7), 12(B-8), and 12(B-9) are sectional and front views showing manufacturing processes for the recording head;

FIGS. 13(A-10), 13(A-11), 13(A-12), and 13(A-13) and FIGS. 13(B-10), 13(B-11), 13(B-12), and 13(B-13) are sectional and front views showing manufacturing processes for the recording head;

FIGS. 14(A-14), 14(A-15), 14(A-16), and 14(A-17) and FIGS. 14(B-14), 14(B-15), 14(B-16), and 14(B-17) are sectional and front views showing manufacturing processes for the recording head;

DETAILED DESCRIPTION

Various embodiments will be described hereinafter with reference to the accompanying drawings. In general, according to one embodiment, a recording head comprises: a main pole configured to produce a recording magnetic field perpendicular to a recording layer of a recording medium; a trailing shield on a trailing side of the main pole with a write gap therebetween; a recording coil configured to produce a magnetic field in the main pole; and a high-frequency oscillator between the trailing shield and a tip portion of the main pole. The main pole comprises a first magnetic pole layer located on a leading side and a second magnetic pole layer laminated on the trailing side of the first magnetic pole layer. The first magnetic pole layer comprises a tapered portion tapered toward the recording medium and a first tip portion having a predetermined width and extending from the tapered portion toward the recording medium, and the second magnetic pole layer comprises a tapered portion tapered toward the recording medium and a second tip portion having a predetermined width and extending from the tapered portion toward the recording medium. A width in a track direction of the second tip portion is smaller than that of the first tip portion, the high-frequency oscillator being between the second tip portion and the trailing shield and comprises a width in the track direction substantially equal to the width in the track direction of the second tip portion, and a height of the first tip portion is taller than that of the second tip portion.

(First Embodiment)

Figure 1:
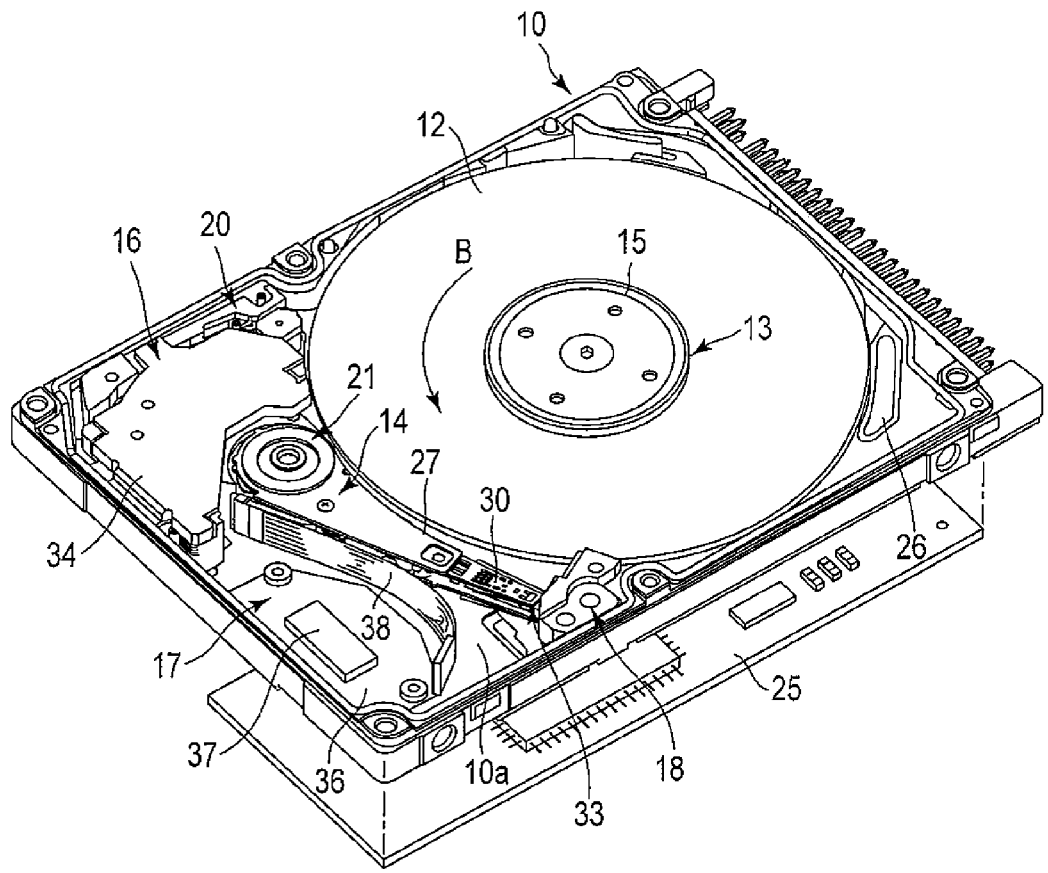
FIG. 1 is a perspective view showing a hard disk drive (HDD) according to a first embodiment.
Figure 2:
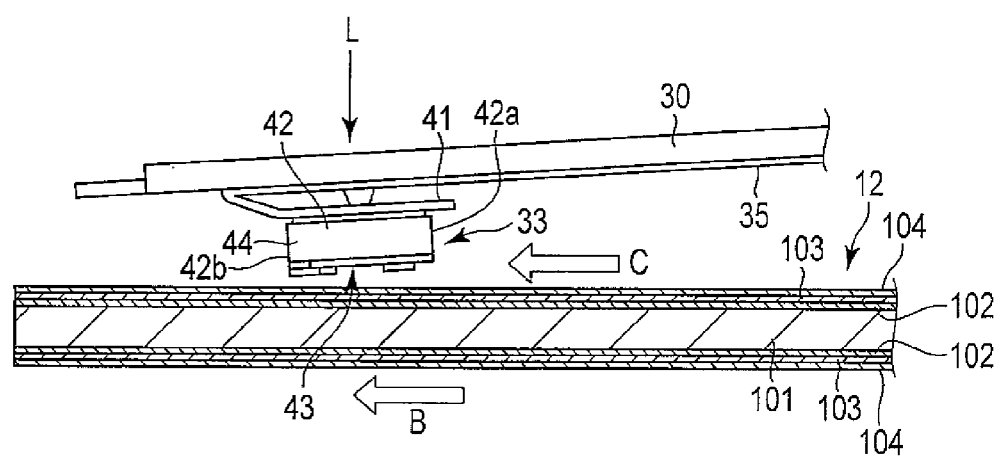
FIG. 2 is a side view showing a magnetic head and suspension of the HDD.

FIG. 1 shows the internal structure of a hard disk drive (HDD) as a disk drive according to a first embodiment with its top cover removed, and FIG. 2 shows a flying magnetic head. As shown in FIG. 1, the HDD comprises a housing 10. The housing 10 comprises a base 10a in the form of an open-topped rectangular box and a top cover (not shown) in the form of a rectangular plate. The top cover is attached to the base by screws such that it closes the top opening of the base. Thus, the housing 10 is kept airtight inside and can be ventilated through a breather filter 26.

The base 10a carries thereon a magnetic disk 12, for use as a recording medium, and a drive section. The drive section comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record and reproduce data on and from the disk 12. The head actuator 14 supports the heads 33 for movement relative to the surfaces of the disk 12. The VCM 16 pivots and positions the head actuator. The base 10a further carries a ramp loading mechanism 18, inertial latch 20, and board unit 17. The ramp loading mechanism 18 holds the magnetic heads 33 in a position off the magnetic disk 12 when the heads are moved to the outermost periphery of the disk. The inertial latch 20 holds the head actuator 14 in a retracted position if the HDD is jolted, for example. Electronic components, such as a preamplifier, head IC, etc., are mounted on the board unit 17.

A control circuit board 25 is attached to the outer surface of the base 10a by screws such that it faces a bottom wall of the base. The circuit board 25 controls the operations of the spindle motor 13, VCM 16, and magnetic heads 33 through the board unit 17.

As shown in FIG. 1, the magnetic disk 12 is coaxially fitted onto a hub of the spindle motor 13, and is clamped by a clamp spring 15 attached to an upper end of the hub by screws, and fixed to the hub. The magnetic disk 12 is rotated at a predetermined speed in an arrow-B direction by the spindle motor 13 as a drive motor.

The head actuator 14 comprises a bearing portion 21 fixed to the bottom wall of the base 10a, and arms 27 extending from the bearing portion 21. The arms 27 are positioned in parallel with the surfaces of the magnetic disk 12, and mutually positioned via a predetermined space, to extend from the bearing portion 21 in the same direction. The head actuator 14 comprises an elongated plate-shaped suspension 30 which is elastically deformable. The suspension 30 is constituted of a leaf spring, and a base end thereof is fixed to a distal end of each of the arms 27 by spot welding or bonding, to extend from the arm. Each of the suspensions 30 may be formed integrally with the corresponding arm 27. At an extending end of the suspension 30, the magnetic head 33 is supported. The arms 27 and the suspensions 30 constitute a head suspension, and this head suspension and the magnetic heads 33 constitute a head suspension assembly.

As shown in FIG. 2, each of the magnetic heads 33 includes a substantially rectangular parallelepiped slider 42, and a head section 44 for recording and reproducing, which is provided at an outflow end (a trailing end) of this slider. The magnetic head 33 is fixed to a gimbal spring 41 provided at the distal end of the suspension 30. To the magnetic head 33, a head load L toward the surface of the magnetic disk 12 is applied, by an elasticity of the suspension 30. Two arms 27 are positioned in parallel with each other with a predetermined space. The suspension 30 and the magnetic head 33 attached to these arms face each other interposing the magnetic disk 12 therebetween.

Each of the magnetic heads 33 is electrically connected to a main FPC 38 described later via a relay flexible printed circuit board (hereinafter referred to as the relay FPC) 35 fixed to the suspension 30 and the arm 27.

As shown in FIG. 1, the board unit 17 includes an FPC main body 36 formed by the flexible printed circuit board, and the main FPC 38 extending from this FPC main body. The FPC main body 36 is fixed to the bottom surface of the base 10a. On the FPC main body 36, a preamplifier 37 and electronic components including a head IC are mounted. The extending end of the main FPC 38 is connected to the head actuator 14, and connected to the magnetic head 33 via each of the relay FPCs 35.

The VCM 16 includes a support frame (not shown) extending from a bearing portion 21 in a direction opposite to the arm 27, and a voice coil supported by the support frame. In a state where the head actuator 14 is incorporated in the base 10a, the voice coil is positioned between a pair of yokes 34 fixed to the base 10a, and constitutes the VCM 16 together with these yokes and magnets fixed to the yokes.

When electricity is conducted through the voice coil of the VCM 16 while the magnetic disk 12 rotates, the head actuator 14 rotates. The magnetic head 33 is moved onto a desirable track of the magnetic disk 12, and positioned. In this case, the magnetic head 33 is moved between an inner peripheral edge and an outer peripheral edge of the magnetic disk, in a radial direction of the magnetic disk 12.

Figure 3:
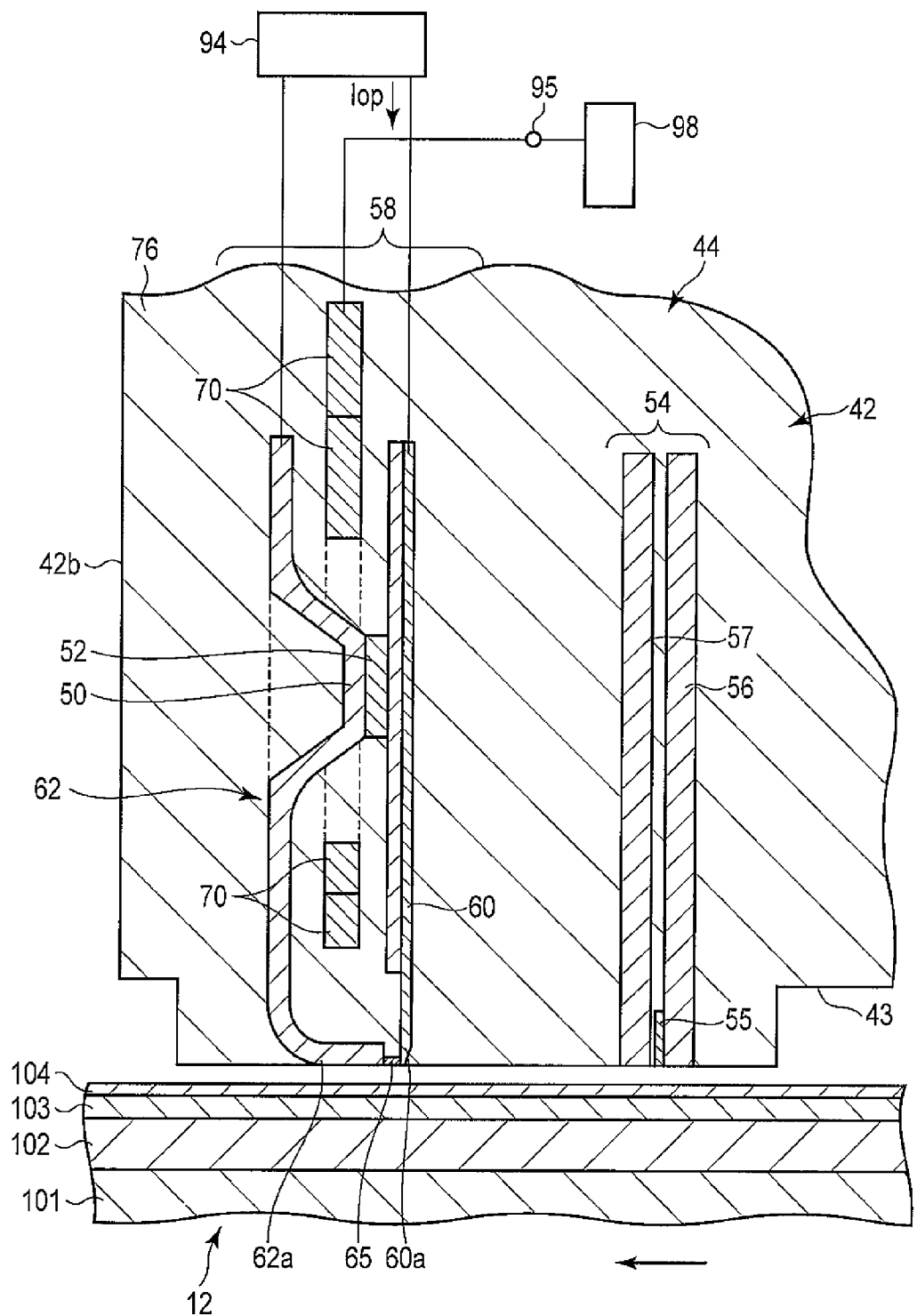
FIG. 3 is an enlarged sectional view showing a head section of the magnetic head.

Next, constitutions of the magnetic disk 12 and the magnetic head 33 will be described in detail. FIG. 3 is an enlarged sectional view showing the head section 44 of the magnetic head 33 and the magnetic disk.

As shown in FIG. 1 to FIG. 3, the magnetic disk 12 includes a substrate 101 made of a nonmagnetic material and formed in, for example, a disc-like shape having a diameter of about 2.5 inches. On each of the surfaces of the substrate 101, there are laminated, in order, a soft magnetic layer 102 as an underlayer which is made of a material showing soft magnetic characteristics; a magnetic recording layer 103, in an upper layer portion of the soft magnetic layer, which has a magnetic anisotropy in a direction perpendicular to a disk surface; and a protective film layer 104 in an upper layer portion of the magnetic recording layer.

As shown in FIG. 2 and FIG. 3, the magnetic head 33 is constituted as a flying type head, and includes the slider 42 formed in the substantially rectangular parallelepiped shape, and the head section 44 formed at the outflow end (trailing) side of the slider. The slider 42 is formed of, for example, a sintered material (Altic) of alumina and titanium carbide, and the head section 44 is formed of a thin film.

The slider 42 has a rectangular disk facing surface (an air bearing surface (ABS)) 43 which faces the surface of the magnetic disk 12. The slider 42 floats upward owing to an air current C generated between the disk surface and the disk facing surface 43 by the rotation of the magnetic disk 12. A direction of the air current C matches a rotating direction B of the magnetic disk 12. The slider 42 is located above the surface of the magnetic disk 12 so that a longitudinal direction of the disk facing surface 43 substantially matches the direction of the air current C.

The slider 42 includes a leading end 42a positioned on an inflow side of the air current C, and a trailing end 42b positioned on an outflow side of the air current C. In the disk facing surface 43 of the slider 42, a not-shown leading step, trailing step, side step, negative pressure cavity and the like are formed.

As shown in FIG. 3, the head section 44 is formed as a dual-element magnetic head, comprising a reproduction head 54 and recording head 58 formed on the trailing end 42b of the slider 42 by thin-film processing. A protective insulating film 76 entirely covers the reproduction head 54 and recording head 58 except for those parts which are exposed in the ABS 43 of the slider 42. The insulating film 76 defines the contour of the head section 44.

The reproduction head 54 comprises a magnetic film 55 having a magnetoresistive effect and shield films 56 and 57 disposed on the trailing and leading sides, respectively, of the magnetic film such that they sandwich the magnetic film between them. The respective lower ends of the magnetic film 55 and shield films 56 and 57 are exposed in the ABS 43 of the slider 42.

Figure 4:
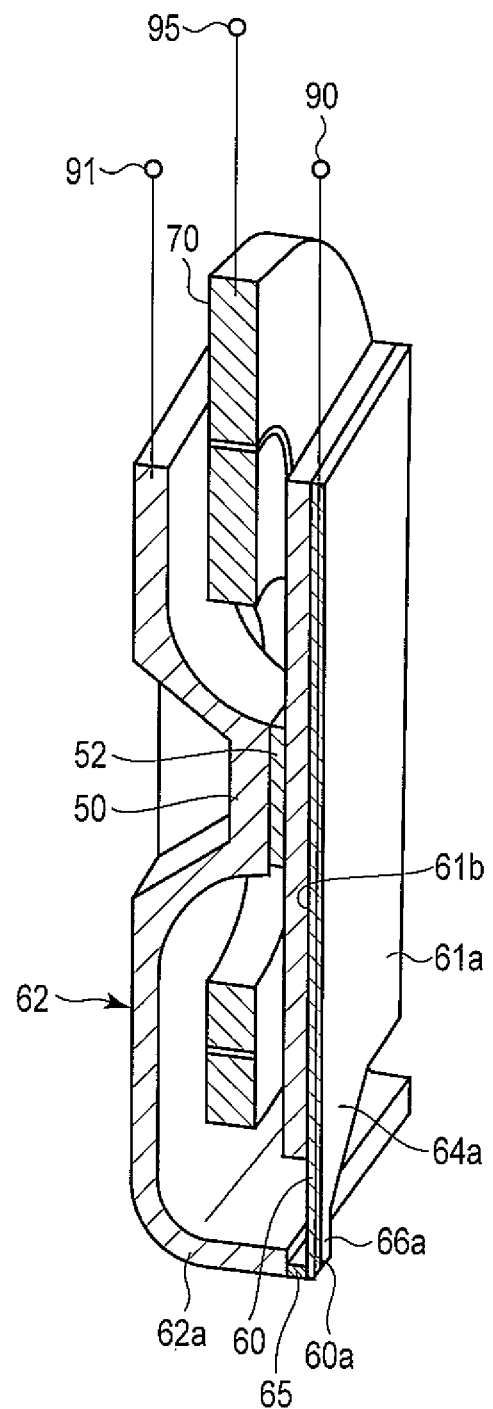
FIG. 4 is a perspective view schematically showing a recording head of the magnetic head.

The recording head 58 is located nearer to the trailing end 42b of the slider 42 than the reproduction head 54. FIG. 4 is a perspective view schematically showing the recording head 58 and magnetic disk 12, and FIG. 5 is an enlarged sectional view showing the disk-side end portion of the recording head 58.

As shown in FIGS. 3 to 5, the recording head 58 comprises a main pole 60, trailing shield (return pole) 62, recording coil 70, and high-frequency oscillatory element of a nonmagnetic, electrically conductive material, for example, spin-torque oscillator 65. The main pole 60 consists mainly of a high-saturation magnetization material that produces a recording magnetic field perpendicular to the surfaces of the magnetic disk 12. The trailing shield 62 is disposed on the trailing side of the main pole 60 and serves to efficiently close a magnetic path through the soft magnetic layer 102 just below the main pole. The recording coil 70 is disposed such that it is wound around a magnetic circuit comprising the main pole 60 and trailing shield 62 to pass magnetic flux to the main pole while a signal is being written to the magnetic disk 12. The spin-torque oscillator 65 is disposed between a tip portion 60a of the main pole 60 and the trailing shield 62 such that it faces the ABS 43.

A power supply 94 is connected to the main pole 60 and trailing shield 62, whereby a current circuit is constructed such that current from the power supply can be supplied in series through the main pole 60, spin-torque oscillator 65, and trailing shield 62.

Figure 7:
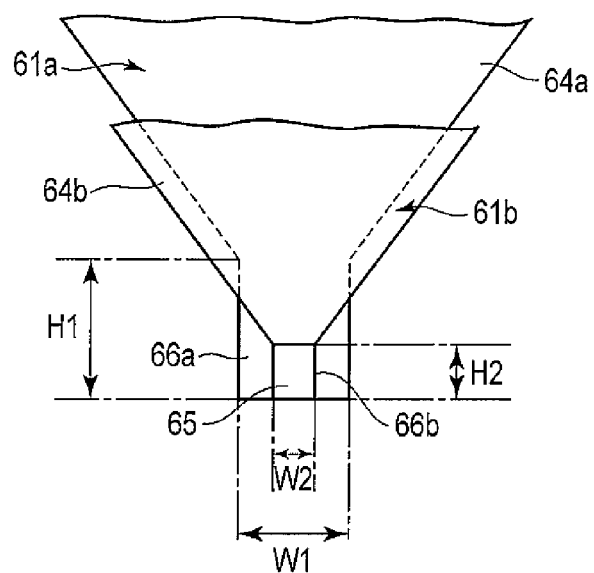
FIG. 7 is a front view showing the high-frequency oscillator and the tapered tip portion of the main pole of the recording head.

FIGS. 6 and 7 are perspective and front views, respectively, showing the high-frequency oscillator and the tapered tip portion of the main pole of the recording head.

As shown in FIGS. 3 to 7, the main pole 60 extends substantially perpendicular to the ABS 43 and the surfaces of the magnetic disk 12. A tip portion 60a of the main pole 60 on the disk side is tapered toward the disk surface. The main pole 60 comprises a first magnetic pole layer 61a located on the leading side and a second magnetic pole layer 61b laminated on the trailing side of the first magnetic pole layer.

The first magnetic pole layer 61a comprises a tapered portion 64a, which is tapered like a funnel toward the magnetic disk and transversely relative to each track, and a first tip portion 66a having a predetermined width and extending from the tapered portion 64a toward the disk. Likewise, the second magnetic pole layer 61b comprises a tapered portion 64b, which is tapered toward the disk and transversely relative to each track, and a second tip portion 66b having a predetermined width and extending from the tapered portion 64b toward the disk. The respective distal or lower ends of the first and second tip portions 66a and 66b are exposed in the ABS 43 of the magnetic head.

Along-track width W1 of the first tip portion 66a is substantially equal to the track width of the magnetic disk 12. Along-track width W2 of the second tip portion 66b on the trailing side of the first tip portion 66a is smaller than width W1 of the first tip portion 66a. The spin-torque oscillator 65 is disposed between the second tip portion 66b and trailing shield 62 and in contact with the second tip portion 66b. The oscillator 65 is formed with an along-track width substantially equal to along-track width W2 of the second tip portion 66b of the second magnetic pole layer 61b.

As shown in FIGS. 5 to 7, height H1 of the first tip portion 66a, that is, the distance from the ABS 43 to an inflection point (boundary) between the first tip portion 66a and tapered portion 64a, is greater than height H2 of the second tip portion 66b, that is, the distance from the ABS 43 to an inflection point (boundary) between the second tip portion 66b and tapered portion 64b.

The saturation magnetic flux density of a soft magnetic material used for the first magnetic pole layer 61a on the leading side may be set lower than that of a soft magnetic material for the second magnetic pole layer 61b on the trailing side. Further, soft magnetic materials with a common saturation magnetic flux density may be used for the first and second magnetic pole layers 61a and 61b, individually. Soft magnetic materials for the main pole 60 and trailing shield 62 may be selected from alloys or compounds that contain iron, cobalt, and/or nickel.

As shown in FIGS. 3 to 5, the trailing shield 62 of the soft magnetic material is disposed on the trailing side of the main pole 60 and serves to efficiently close the magnetic path through the soft magnetic layer 102 just below the main pole. The trailing shield 62 is substantially L-shaped and comprises a tip portion 62a opposite the tip portion of the main pole 60 and a junction 50 connected to the main pole. The junction 50 is connected through a nonconductor 52 to an upper part of the main pole 60 located apart from the ABS 43.

The tip portion 62a of the trailing shield 62 has an elongated rectangular shape. The distal end surface of the trailing shield 62 is exposed in the ABS 43 of the slider 42. The leading end surface of the tip portion 62a extends transversely relative to each track of the magnetic disk 12. This leading end surface is opposed substantially parallel to the second tip portion 66b of the main pole 60 with a write gap therebetween.

The spin-torque oscillator 65 is formed by successively laminating, for example, an underlayer, spin injection layer (second magnetic layer), intermediate layer, oscillatory layer, and cap layer from the main-pole side to the trailing-shield side. As shown in FIGS. 3 and 4, terminals 90 and 91 are connected to the main pole 60 and trailing shield 62, respectively, and also to the power supply 94. The current circuit is constructed such that current Iop from the power supply 94 can be supplied in series through the main pole 60, spin-torque oscillator 65, and trailing shield 62.

The recording coil 70 is disposed between, for example, the main pole 60 and trailing shield 62 such that it is wound around the junction 50. A terminal 95 is connected to the recording coil 70, and a second power supply 98 to the terminal 95. Current supplied from the second power supply 98 to the recording coil 70 is controlled by a control unit of the HDD. In writing a signal to the magnetic disk 12, a predetermined current is supplied from the second power supply 98 to the recording coil, whereby magnetic flux is passed through the main pole 60 to produce a magnetic field.

Figure 10:
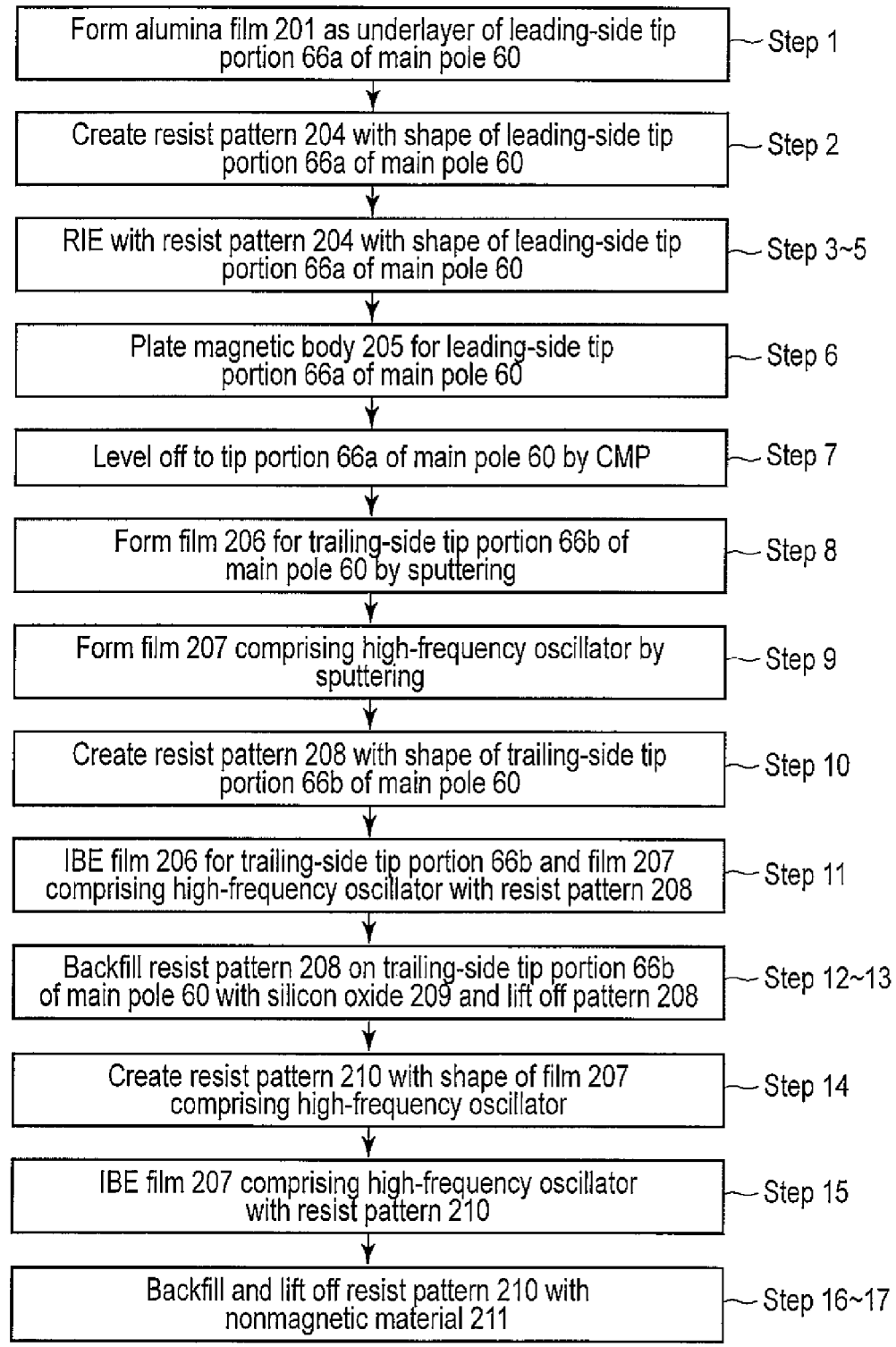
FIG. 10 is a flowchart showing manufacturing processes for the recording head.

The following is a description of processes for manufacturing the recording head 58 constructed in this manner. FIG. 10 is a flowchart showing the manufacturing processes, and FIGS. 11 to 13 are sectional and front views illustrating the processes.

First, as shown in FIGS. 10, 11(A-1) and 11(B-1), a non-magnetic film 201 (of $Al_2O_3$, $SiO_2$, etc.) is formed, as an underlayer of the tip portion 66a of the first magnetic pole layer 61a of the main pole 60, on a film 203 of a nonmagnetic metal (tantalum, ruthenium, etc.), and a film 202 of a hard, nonmagnetic material (ruthenium, etc.) is formed on the film 201 (Step 1). Then, as shown in FIGS. 11(A-2) and 11(B-2), a resist pattern 204 with a shape of the tip portion 66a of the first magnetic pole layer 61a of the main pole 60 is created on the film 202 (Step 2).

Subsequently, as shown in FIGS. 11(A-3) and 11(B-3), the film 202 is etched into the shape of the tip portion 66a by ion-beam etching (IBE) using the resist pattern 204 (Step 3). As shown in FIGS. 11(A-4) and 11(B-4), thereafter, the resist pattern 204 is removed (Step 4). As shown in FIGS. 11(A-5) and 11(B-5), the underlayer 201 is etched into the shape of the tip portion 66a of the first magnetic pole layer 61a of the main pole 60 through the film 202 by reactive ion etching (RIE) (Step 5).

As shown in FIGS. 10, 12(A-6) and 12(B-6), a magnetic body 205 to constitute the tip portion 66a of the first magnetic pole layer 61a is plated (Step 6). As shown in FIGS. 12(A-7) and 12(B-7), moreover, the resulting deposit is leveled off to the tip portion 66a of the first magnetic pole layer 61a by chemical-mechanical polishing (CMP) (Step 7). An underlayer of an electrical conductor (ruthenium, etc.) may be attached below the magnetic body 205.

As shown in FIGS. 12(A-8) and 12(B-8), a film 206 to constitute the second magnetic pole layer 61b of the main pole 60 is formed on the tip portion 66a of the first magnetic pole layer 61a by sputtering (Step 8). As shown in FIGS. 12(A-9) and 12(B-9), moreover, a film 207 comprising a high-frequency oscillator is formed on the film 206 by sputtering (Step 9).

As shown in FIGS. 13(A-10) and 13(B-10), a resist pattern 208 with a shape of the tip portion 66b of the second magnetic pole layer 61b is created (Step 10). Then, as shown in FIGS. 13(A-11) and 13(B-11), the film 206 to constitute the tip portion 66b of the second magnetic pole layer 61b and the film 207 comprising the high-frequency oscillator are ion-beam-etched using the resist pattern 208 (Step 11).

As shown in FIGS. 13(A-12), 13(B-12), 13(A-13) and 13(B-13), the resist pattern 208 on the tip portion 66b of the second magnetic pole layer 61b of the main pole 60 is backfilled with silicon oxide 209 (Step 12) and then lifted off (Step 13).

As shown in FIGS. 14(A-14) and 14(B-14), a resist pattern 210 with a shape of the film 207 comprising the high-frequency oscillator is created (Step 14). Then, as shown in FIGS. 14(A-15) and 14(B-15), the film 207 comprising the high-frequency oscillator is ion-beam-etched using the resist pattern 210 (Step 15).

As shown in FIGS. 14(A-16), 14(B-16), 14(A-17) and 14(B-17), the resist pattern 210 is backfilled with a nonmagnetic material 211 (Step 16) and then lifted off (Step 17). The main pole 60 having the above-described configuration is formed by these processes.

If the VCM 16 is activated, according to the HDD constructed in this manner, the head actuator 14 pivots, whereupon each magnetic head 33 is moved to and positioned on the desired track of the magnetic disk 12. Further, the magnetic head 33 is caused to fly by airflow C that is produced between the disk surface and the ABS 43 as the magnetic disk 12 rotates. When the HDD is operating, the ABS 43 of the slider 42 is located opposite the disk surface with a gap therebetween. As shown in FIG. 2, the magnetic head 33 is caused to fly with the recording head 58 of the head section 44 inclined to be closest to the surface of the disk 12. In this state, the reproduction head 54 reads recorded data from the disk 12, while the recording head 58 writes data to the disk.

In writing, as shown in FIG. 3, a direct current is supplied from the power supply 94 to the main pole 60, spin-torque oscillator 65, and trailing shield 62. Thereupon, a high-frequency magnetic field is produced by the oscillator 65 and applied to the magnetic recording layer 103 of the magnetic disk 12. As an alternating current is supplied from the power supply 98 to the recording coil 70, moreover, the main pole 60 is excited by the coil 70, whereupon a perpendicular recording magnetic field is applied to the recording layer 103 of the magnetic disk 12 just below the main pole. Thus, data is recorded on the recording layer 103 with a desired track width. Magnetic recording with high coercive force and high magnetic anisotropic energy can be achieved by superposing the high-frequency magnetic field on the recording magnetic field. By passing current from the main pole 60 to the trailing shield 62, moreover, disturbance of a magnetic domain in the main pole 60 can be eliminated to provide an efficient magnetic path, so that a magnetic field produced by the distal end of the main pole is enhanced.

If the first and second tip portions 66a and 66b of the first and second magnetic pole layers 61a and 61b that constitute the main pole 60 are formed such that along-track widths W1 and W2 and heights H1 and H2 satisfy W1>W2 and H1>H2, moreover, magnetic field leakage from the edge portion of the leading end portion of the main pole 60 transversely relative to each track can be reduced, so that degradation or erasure of recorded data can be suppressed. In this way, degradation and erasure of recorded data on adjacent recording tracks of the magnetic disk 12 can be prevented without failing to maintain recording capability on write tracks. Thus, the track density of the recording layer of the magnetic disk 12 can be increased, so that the recording density of the HDD can be improved.

Figure 8:
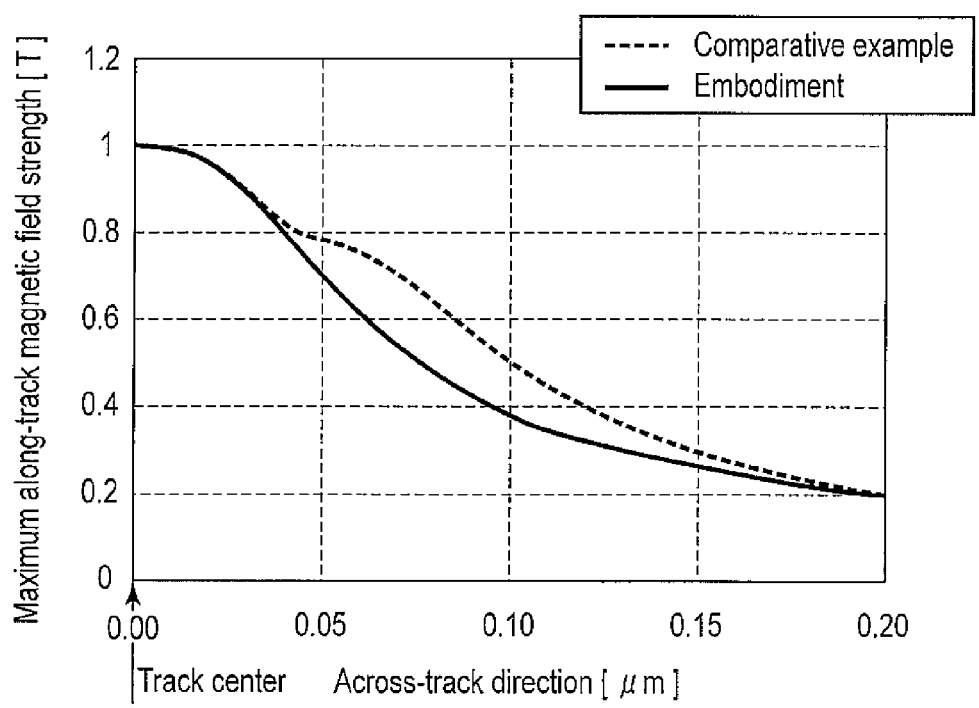
FIG. 8 is a diagram comparatively showing the relationship between across-track position and maximum along-track magnetic field strength for the recording head according to the first embodiment and a recording head according to a comparative example.

FIG. 8 comparatively shows across-track distributions of the maximum along-track strength of magnetic fields produced by magnetic cores of the recording head 58 of the HDD according to the first embodiment and a recording head according to a comparative example. The recording head according to the comparative example is configured so that first and second tip portions of first and second magnetic pole layers of a main pole are formed with a common along-track width and common height. The magnetic field strength distributions shown in FIG. 8 are based on the assumption that along-track widths W1 and W2 of the first and second tip portions 66a and 66b of the first and second magnetic pole layers 61a and 61b of the recording head 58 are 100 and 50 nm, respectively.

In the case of the recording head according to the comparative example, as can be seen from FIG. 8, a region with a large distribution extends to the vicinity of the track edge of the main pole. In the case of the recording head according to the present embodiment, in contrast, a swell of the magnetic field distribution is reduced in regions farther from the track center than the track edge of the main pole 60.

FIG. 9 comparatively shows the bit-error rates (BERs) of the recording head 58 of the HDD according to the first embodiment and the recording head according to the comparative example, determined by an adjacent track erase test.

After random data is recorded at the track center, in this test, a signal is recorded after movement for an arbitrary track pitch from the track center transversely relative to each track. When the position is returned to the track center, thereafter, a fringe BER of the firstly recorded signal is measured with the track pitch varied. As can be seen from FIG. 9, the track pitch of the recording head according to the first embodiment can be made smaller than that of the recording head according to the comparative example, in terms of the fringe BER of a feasible track pitch for the HDD. Thus, the track density of the magnetic disk in the HDD can be increased.

According to the present embodiment, as described above, there can be provided a recording head, capable of suppressing degradation or erasure of recorded data and achieving high recording density, and a disk drive with the same.

The following is a description of an HDD according to another embodiment. In the description of the second embodiment to follow, like reference numbers are used to designate the same parts as those of the first embodiment, and a detailed description thereof is omitted. Different parts will be mainly described in detail.

(Second Embodiment)

Figure 15:
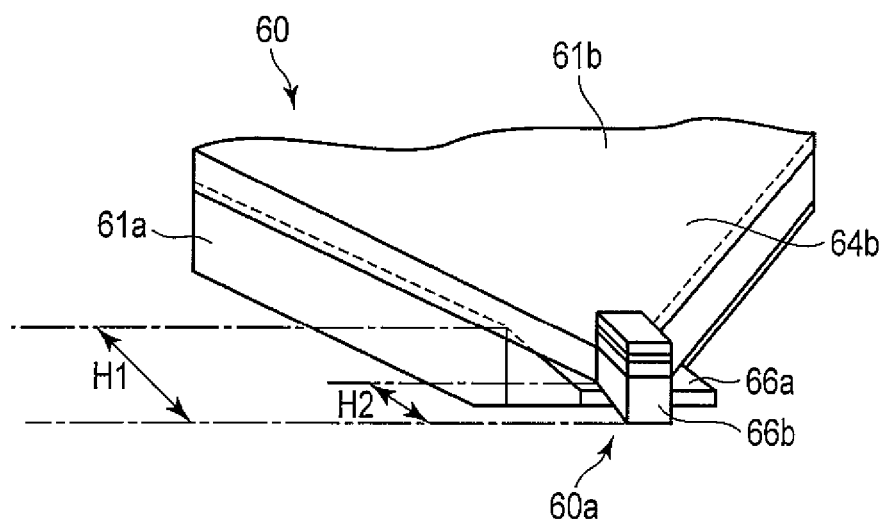
FIG. 15 is a perspective view showing a main pole tip portion of a recording head of an HDD according to a second embodiment.
Figure 16:
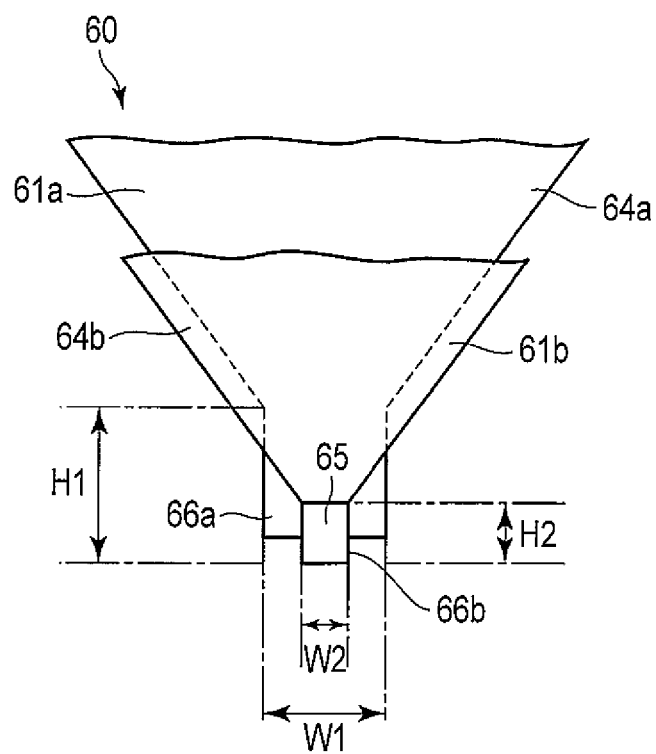
FIG. 16 is a front view showing the main pole tip portion of the recording head of the HDD according to the second embodiment.

FIGS. 15 and 16 are enlarged perspective and front views, respectively, of the tip portion of a recording head of a magnetic head of the HDD according to the second embodiment. According to the present embodiment, a tip portion 60*a* of a main pole 60 on the side of a magnetic disk 12 is tapered toward the disk surface. The main pole 60 comprises a first magnetic pole layer 61*a* located on the leading side and a second magnetic pole layer 61*b* laminated on the trailing side of the first magnetic pole layer.

The first magnetic pole layer 61*a* comprises a tapered portion 64*a*, which is tapered like a funnel toward the magnetic disk and transversely relative to each track, and a first tip portion 66*a* having a predetermined width and extending from the tapered portion 64*a* toward the disk. Likewise, the second magnetic pole layer 61*b* comprises a tapered portion 64*b*, which is tapered toward the disk and transversely relative to each track, and a second tip portion 66*b* having a predetermined width and extending from the tapered portion 64*b* toward the disk. The distal or lower end of the second tip portion 66*b* is exposed in an ABS 43 of the magnetic head. The distal end of the first tip portion 66*a* is located more distant (or recessed) from the disk (or the ABS of the head) than the distal end of the second tip portion 66*b*.

Along-track width W1 of the first tip portion 66*a* is substantially equal to the track width of the magnetic disk 12. Along-track width W2 of the second tip portion 66*b* on the trailing side of the first tip portion 66*a* is smaller than width W1 of the first tip portion 66*a*. A spin-torque oscillator 65 is disposed between the second tip portion 66*b* and a trailing shield 62 and in contact with the second tip portion 66*b*. The oscillator 65 is formed with an along-track width substantially equal to along-track width W2 of the second tip portion 66*b* of the second magnetic pole layer 61*b*.

Height H1 of the first tip portion 66*a*, that is, the distance from the ABS 43 to an inflection point (boundary) between the first tip portion 66*a* and tapered portion 64*a*, is greater than height H2 of the second tip portion 66*b*, that is, the distance from the ABS 43 to an inflection point (boundary) between the second tip portion 66*b* and tapered portion 64*b*.

The saturation magnetic flux density of a soft magnetic material used for the first magnetic pole layer 61*a* on the leading side may be set lower than that of a soft magnetic material for the second magnetic pole layer 61*b* on the trailing side. Further, soft magnetic materials with a common saturation magnetic flux density may be used for the first and second magnetic pole layers 61*a* and 61*b*, individually. Soft magnetic materials for the main pole 60 and trailing shield 62 may be selected from alloys or compounds that contain iron, cobalt, and/or nickel.

By means of the magnetic head comprising the recording head constructed in this manner, magnetic field leakage transversely relative to each track can be suppressed, and the track density of the disk drive using the high-frequency oscillator can be increased. Thus, there can be provided a recording head, capable of suppressing degradation or erasure of recorded data and achieving high recording density, and a disk drive with the same.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes, sizes, etc., of the constituent elements of the head section may be changed if necessary. In the magnetic disk drive, moreover, the numbers of magnetic disks and heads can be increased as required, and the disk size can be variously selected.

What is claimed is:

1. A recording head comprising:
    a main pole configured to produce a recording magnetic field perpendicular to a recording layer of a recording medium;
    a trailing shield on a trailing side of the main pole with a write gap therebetween;
    a recording coil configured to produce a magnetic field in the main pole; and
    a high-frequency oscillator between the trailing shield and a tip portion of the main pole, wherein
    the main pole comprises a first magnetic pole layer located on a leading side and a second magnetic pole layer laminated on the trailing side of the first magnetic pole layer,
    the first magnetic pole layer comprises a first tapered portion tapered toward the recording medium and a first tip portion having a predetermined width and extending from the first tapered portion toward the recording medium,
    the second magnetic pole layer comprises a second tapered portion tapered toward the recording medium and a second tip portion having a predetermined width and extending from the second tapered portion toward the recording medium,
    a width in a track direction of the second tip portion is smaller than that of the first tip portion, the high-frequency oscillator being between the second tip portion and the trailing shield and comprising a width in the track direction substantially equal to the width in the track direction of the second tip portion, and a height of the first tip portion being taller than that of the second tip portion.

2. The recording head of claim 1, wherein a distal end of the first tip portion of the first magnetic pole layer is located more distant from the recording medium than a distal end of the second tip portion.

3. The recording head of claim 2, wherein the saturation magnetic flux density of a soft magnetic material used for the first magnetic pole layer is lower than that of a soft magnetic material used for the second magnetic pole layer.

4. The recording head of claim 1, wherein the saturation magnetic flux density of a soft magnetic material used for the first magnetic pole layer is lower than that of a soft magnetic material used for the second magnetic pole layer.

5. A disk drive comprising:
  a recording medium comprising a magnetic recording layer having magnetic anisotropy perpendicular to a surface of the medium;
  a drive section configured to rotate the recording medium; and
  a magnetic head comprising the recording head of claim 1 configured to perform data processing on the recording medium.

6. The disk drive of claim 5, wherein a distal end of the first tip portion of the first magnetic pole layer is located more distant from the recording medium than a distal end of the second tip portion.

7. The disk drive of claim 6, wherein the saturation magnetic flux density of a soft magnetic material used for the first magnetic pole layer is lower than that of a soft magnetic material used for the second magnetic pole layer.

8. The disk drive of claim 5, wherein the saturation magnetic flux density of a soft magnetic material used for the first magnetic pole layer is lower than that of a soft magnetic material used for the second magnetic pole layer.

* * * * *